United States Patent [19]

Conteas

[11] 4,110,624
[45] Aug. 29, 1978

[54] X-RAY FILM HOLDER OR CASSETTE

[76] Inventor: Alexander P. Conteas, 16690 Glass Mountain St., Fountain Valley, Calif. 92708

[21] Appl. No.: 767,528

[22] Filed: Feb. 10, 1977

Related U.S. Application Data

[63] Continuation-in-part of Ser. No. 663,960, Mar. 4, 1976, abandoned.

[51] Int. Cl.² .............................................. G03C 5/16
[52] U.S. Cl. ................................................... 250/481
[58] Field of Search ................. 250/480, 481, 482, 508

[56] References Cited

U.S. PATENT DOCUMENTS

| | | | |
|---|---|---|---|
| 1,933,652 | 11/1933 | Boldingh | 250/481 |
| 2,103,961 | 12/1937 | Wilmanns | 250/481 |
| 2,817,020 | 12/1957 | Akers | 250/481 |

*Primary Examiner*—Alfred E. Smith
*Assistant Examiner*—T. N. Grigsby
*Attorney, Agent, or Firm*—Albert M. Herzig; Edward C. Walsh

[57] ABSTRACT

A cassette constructed to serve as a film holder for X-ray film or the like. The cassette is a rectangular container or box having a hinged cover, hinged by way of a piano type hinge and having a catch member opposite the hinge for holding the cover in closed position. A light trap is provided around the peripheral edges of the box and cover to make the container light tight. Preferably the hinge and catch members are fabricated from continuous metal strips.

17 Claims, 7 Drawing Figures

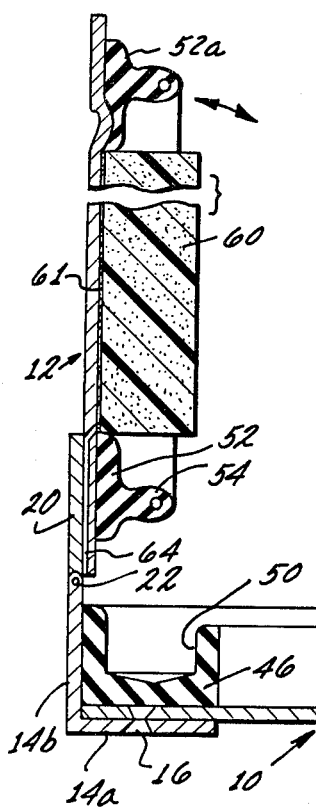
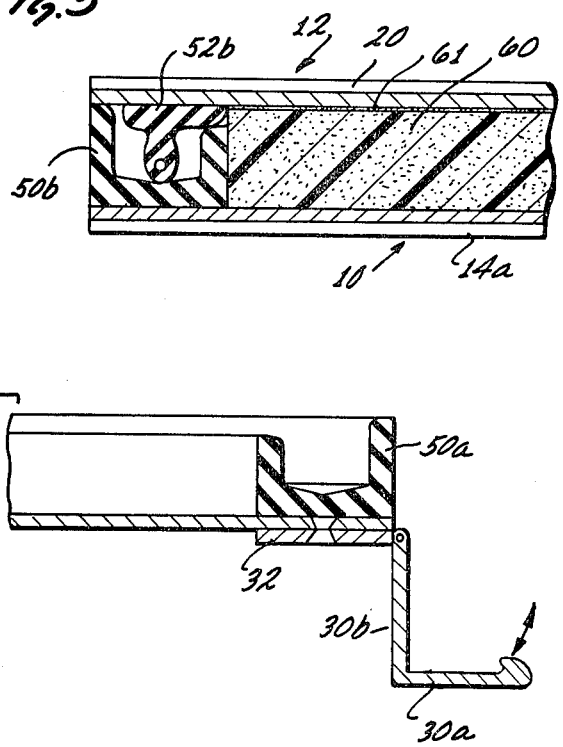
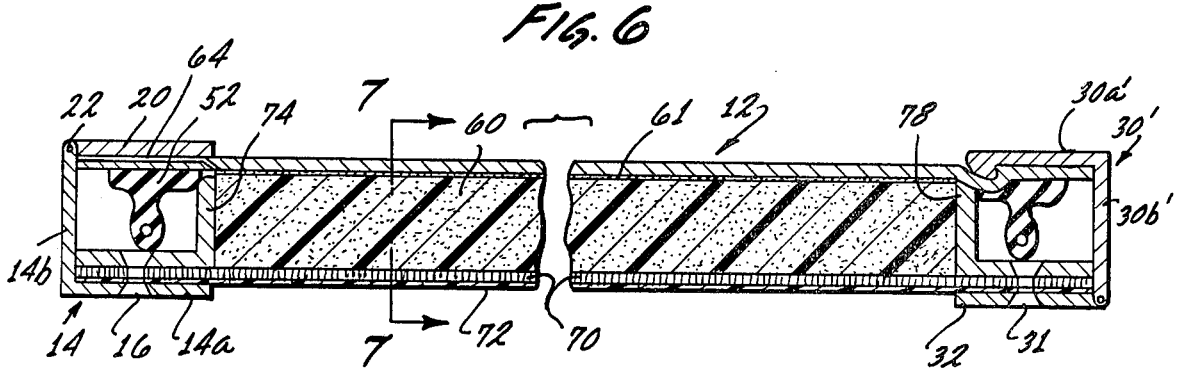
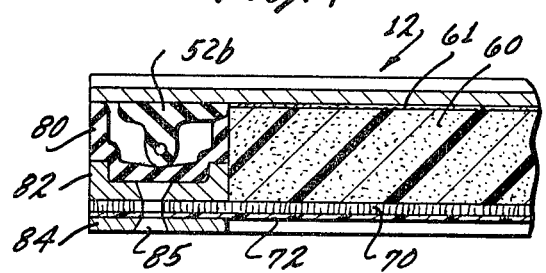

X-RAY FILM HOLDER OR CASSETTE

This application is a continuation-in-part of Serial No. 663,960 filed Mar. 4, 1976 and now abandoned.

BACKGROUND OF THE INVENTION

1. Field of the Invention

The field of the invention is that of cassettes or containers of a type constructed to hold objects or materials which are not to be exposed to light such as X-ray film or the like.

2. Description of the Prior Art

Known prior art patents are U.S. Pat. Nos. 3,466,440; 3,511,990; and 3,703,272. The prior art patents teach cassettes or holders embodying light trap construction but which do not embody the improvements of the herein invention as identified more specifically hereinafter.

SUMMARY OF THE INVENTION

The cassette of the invention is in the form of a box or container having a hinged cover. The bottom of the container is conveniently referred to as the front and the hinged cover as the back. These parts are made of preferred materials as identified hereinafter.

A soft resilient material is provided cemented to the inside or obverse of the back, that is the cover, for purposes of holding the film in close contact with the obverse or inside of the front or bottom. The preferred materials are identified hereinafter.

The back or cover is attached to the other part by way of full length hinge and this is preferably fabricated from continuous lengths of stainless steel or other metal. On the side of the cassette opposite the hinge is a catch which is a full length element also preferably made of stainless steel or other metal. This is an angle member configurated to fit up over the cover or back to hold it in closed position. One or more air holes is provided to relieve the pressure of the air when opening or closing the holder.

In the light of the foregoing, the primary object is to provide an improved cassette or film holder which is of simplified construction whereby it can be fabricated very economically, but yet achieve a very effective product.

A further object is to provide a cassette as in the foregoing, provided with a continuous light trap on the inside thereof at the sides or peripheral edges of the cassette.

A further object is to realize a cassette as in the foregoing having a continuous hinge member hinging the cover along one edge of the cassette formed as a continuous metal strip. A collorary object is to provide a catch or holder adjacent the opposite edge of the cassette formed as an angle bar in cross section and also fabricated as a continuous metal strip.

Further objects and additional advantages of the invention will become apparent from the following detailed description and annexed drawings wherein:

FIG. 4 is a cross-sectional view of the cassette with the cover or back open and with the catch in disengaged position;

FIG. 5 is a partial cross-sectional detailed view taken along line 5—5 of FIG. 1;

FIG. 6 is a cross-sectional view of a modified form of cassette;

FIG. 7 is a cross-sectional view taken along the line 7—7 of FIG. 6.

DESCRIPTION OF THE PREFERRED EMBODIMENTS

Figure 1:
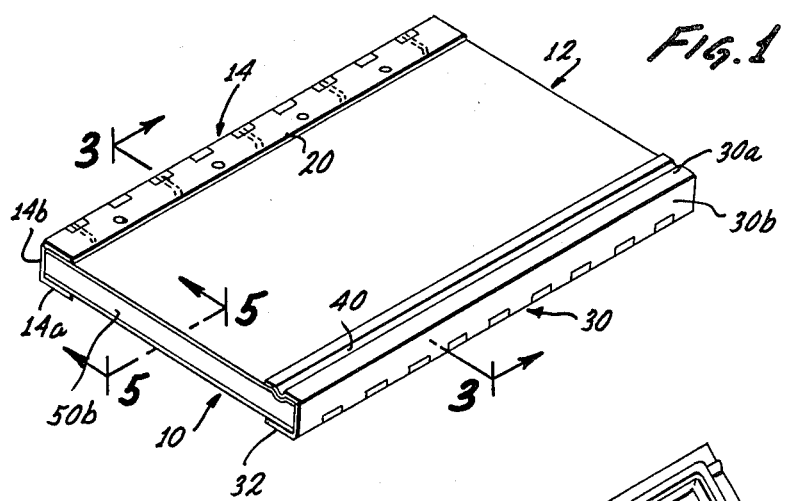
FIG. 1 is an isometric view of a preferred form of the invention.
Figure 2:
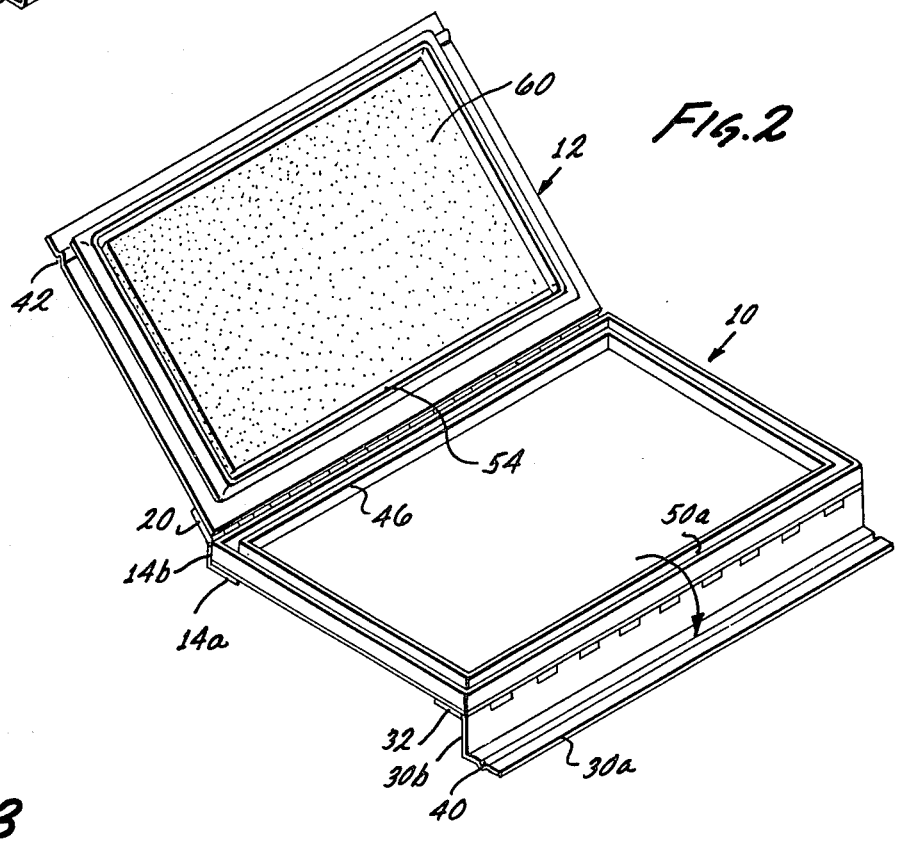
FIG. 2 is an isometric view showing the cassette in open position.

A preferred embodiment is illustrated in FIGS. 1–5. The front or bottom of the cassette is designated at 10 and the back or top is designated at 12. The front, preferably may be fabricated of magnesium alloy, aluminum alloy, or any other radiolucent plastic or metal. It is in sheet form as shown.

A hinge is provided along one edge or at one side of the cassette. The hinge extends the full length of the cassette and preferably may be fabricated from a continuous length of metal. The material may be stainless steel or other metal. The hinge includes a right angle member as designated at 14 having right angle portions 14a and 14b, and the member 14 is secured to one edge of the front or bottom panel 10 by a rivet as designated at 16. The hinge includes hinge member 20 which extends the full length of the cassette. The hinge is a piano type hinge, the hinge member 20 being pivoted to the angle member 14 by pivot pin or rod 22, as may be seen in the Figures. The hinge member 20 is secured to the top or back member 12 preferably by way of rivets.

Along the opposite side of the cassette is the catch member identified by the numeral 30. The member 30 extends full length along the cassette and is made of the same material as the hinge parts. These parts are preferably full length pieces but they could be made of shorter pieces. The catch comprises a right angle member 30 having right angle pieces 30a and 30b. Numeral 32 designates a strip of metal made of the same material which is attached to the underside of the front or bottom panel 10 by a rivet as shown at 34. Part 30b of catch 30 is attached to the piece 32 by a rod or pin 36 providing a similar type of hinge, that is a piano hinge. The part 30a has an inward depression 40 which mates with a corresponding depression 42 formed along the edge of the top or back panel 12.

Figure 3:
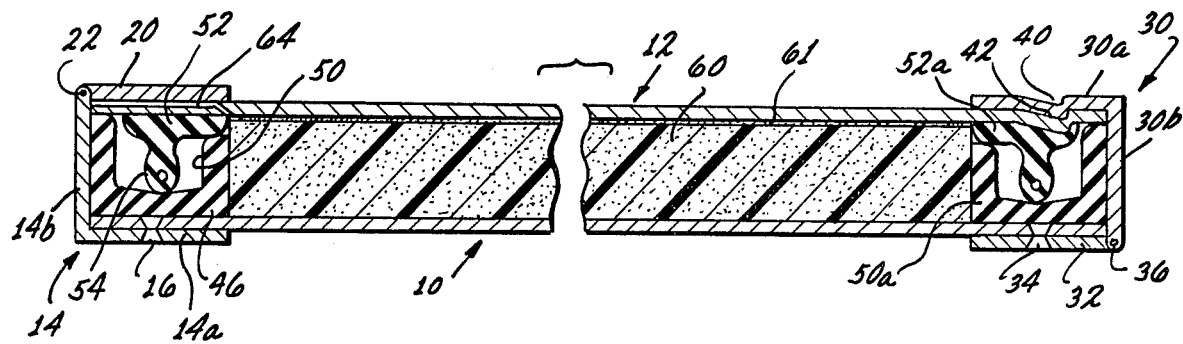
FIG. 3 is a cross-sectional view taken along the line 3—3 of FIG. 1.

Provided within the cassette, that is along all side edges, is a light trap. In the form of the invention shown, the cassette is rectangular, having sides and ends, the back or cover being hinged along one side edge and the catch being along the opposite side edge. The light trap provided is continuous along both sides and ends. FIGS. 3 and 4 illustrate the configuration of the light trap along the two sides of the cassette. FIG. 4 illustrates the back or cover in the open position. The light trap is configured of two parts formed preferably of molded spongy opaque plastic material so that when the film holder or cassette is closed it shuts out light so that the film is not exposed to light. This material also acts as a spring for the catch to cause it to be retained in closed position, with the back pressed against the grip of the catch. The light trap is formed of male and female parts. The female part is designated at 46 and has a cross section as shown in FIGS. 3 and 4, having upstanding side walls as shown, the inner one being slightly lower providing between them channel 50. The male part of the light trap is provided by a member designated at 52 which has a base part that is secured to the obverse or underside of the back or top by being cemented thereto. The male member has an extending part as designated at 54 which fits into the channel 50 of the female part 46, as illustrated in the figures to provide a tight fit which prevents light from entering the cassette. The light trap along the opposite side of the cassette is of the same construction and the two parts are designated at 50a and 52a.

The light trap construction along the ends of the cassette is the same as that described along the sides. FIG. 5 illustrates the light construction along one edge, the parts being designated 50b and 52b. The parts of the light trap may be constructed as continuous strips along the sides and ends or these parts can be constructed as single continuous strips extending all the way around the cassette along both sides and ends. As illustrated in FIG. 5, the ends of the cassette are closed only by the male and female parts of the light trap.

Numeral 60 designates a pad which preferably may be foam rubber or plastic, although a pad of felt may be used, which is cemented to the obverse or underside of the back by glue as designated at 61 in FIG. 5. Its purpose is to hold the film in close contact with the obverse side of the front.

Numeral 64 designates an air hole which serves to relieve the pressure of the air when opening or closing the holder. The size of the hole or holes vary with the size of the cassette holder.

FIGS. 6 and 7 show a modified form of the invention. The parts that are the same as in the previous modification are identified by the same reference characters. Normally, in connection with the films there is used a focusing grid. It is a commercial element for purposes of assisting in focusing, that is gathering scattered rays, etc. In the modification of FIGS. 6 and 7, the focusing grid is utilized as a part of the cassette. It is designated by the numeral 70 and occupies a position in the holder occupied by the bottom panel 10 in the previous embodiment. Preferably it is covered by a thin layer of plastic 72. In FIG. 6, in addition to the angle member 14, an additional right angle member 74 is provided, one part of which is riveted to the grid 70 and the part 14a by rivet 16, as shown in FIG. 6.

The right angle member 74 is nuded because the focusing grid 70 is fragile. It preferably is of stainless steel.

Thus, the upright parts of the angle members 14 and 74 form a channel to receive the light trap member 52 which extend down into the channel as shown. In this form of the invention, it is not necessary to provide the female part 50 of the light trap as in the previous embodiment.

The construction of the catch along the edge opposite the hinge is as shown in FIG. 6. As with respect to the hinge, an additional angle member 78 is provided which is riveted to the grid over the member 32 by rivet 31 forming a channel as described in connection with the hinge. Light trap member 52a extends down into the channel formed. The catch is identified at 30', the part 30a' having an annular depressed formation 40' in it that mates with a corresponding formation 42' in the back or top 12.

FIG. 7 is a cross section taken along lines 7—7 of FIG. 6. It corresponds to FIG. 5 of the previous embodiment. Parts that are the same as in previous embodiment are identified by the same reference characters. This FIG. 7 shows the construction along ends of the cassette of FIG. 6. In this figure the female part member of the light trap is designated at 80. Numeral 82 designates a stainless steel U-channel that is secured to the grid 70 along ends thereof and a steel backing plate 84 by rivet 85. Light trap female member 80 is configurated to fit into U-channel 82 as shown.

From the foregoing, those skilled in the art will readily understand the nature and construction of the invention and the manner in which it achieves and realizes all of the objects as set forth in the foregoing.

The foregoing is representative of preferred forms of the invention and is to be interpreted in an illustrative rather than a limiting sense, the invention to be accorded the full scope of the claims appended hereto.

What is claimed:

1. A cassette construction comprising a flat plate front member, a flat plate back member, a hinge construction along a side edge of the front and back plate members, the hinge construction comprising an angle member secured to the front plate member and a hinge member hinged to the angle member and secured to the back plate member in a position spaced from the front plate member, the angle member forming a wall of the cassette and a catch construction along opposite edges of the front and back plate members, the catch construction comprising a support member secured to the front plate and an angular catch member hinged to the said support member in a position to engage with the back plate member to hold it in position, the catch member forming a wall of the cassette and means forming a light trap provided along the edges of the cassette on the inside thereof.

2. A construction as in claim 1, including a piece of resilient material secured to the underside of the back member.

3. A construction as in claim 1, wherein the said hinge construction members are formed as continuous strips of material.

4. A construction as in claim 3, wherein the catch construction parts are formed of continuous strips of material.

5. A construction as in claim 1, wherein the said light trap is constructed of a female part formed of molded spongy material having a channel and a male part formed of molded spongy material having an extending projection adapted to extend into said channel.

6. A construction as in claim 5, wherein the cassette has sides and ends, and the ends being closed only by the male and female parts of the light trap.

7. A construction as in claim 6, wherein the male and female parts of the light trap at the ends of the cassette are bonded respectively to the back member and front member.

8. A construction as in claim 1, wherein the flat plate front member comprises a focusing grid.

9. A construction as in claim 8, including a first further angle member secured to the grid and having a part extending between the front and back members and a second further angle member secured to the grid and having a part extending between the front and back members adjacent to the catch member.

10. A construction as in claim 9, wherein the respective angle members are positioned with respect to the hinge construction and catch construction to form a channel along peripheral edges of the cassette, the light trap including a male light trap member in the form of a projection formed of spongy opaque material positioned to extend into said channel.

11. A construction as in claim 8, including a U-shape channel member secured to the said grid along the ends thereof as a reinforcing member, the light trap including a female member configured to fit into the channel member.

12. A cassette construction comprising a flat plate front member, a flat plate back member, a hinge construction along a side edge of the front and back plate members, the hinge construction comprising an angle member secured to the front plate member and a hinge member hinged to the angle member and secured to the back plate member in a position spaced from the front plate member, and a catch construction along opposite edges of the front and back plate members, the catch construction comprising a support member secured to the front plate and an angular catch member hinged to the said support member in a position to engage with the back plate member to hold it in position, and means forming a light trap provided along the edges of the cassette on the inside thereof, said hinge construction members being formed as continuous strips of material, and the catch construction being formed of continuous strips of material.

13. A cassette construction comprising a flat plate front member, a flat plate back member, a hinge construction along a side edge of the front and back plate members, the hinge construction comprising an angle member secured to the front plate member and a hinge member hinged to the angle member and secured to the back plate member in a position spaced from the front plate member, and a catch construction along opposite edges of the front and back plate members, the catch construction comprising a support member secured to the front plate and an angular catch member hinged to the said support member in a position to engage with the back plate member to hold it in position, and means forming a light trap provided along the edges of the cassette on the inside thereof, the said light trap being constructed of a female part formed of molded spongy material having a channel and a male part formed of a molded spongy material having an extending projection adapted to extend into said channel.

14. A cassette construction comprising a flat plate front member, a flat plate back member, a hinge construction along a side edge of the front and back plate members, the hinge construction comprising an angle member secured to the front plate member and a hinge member hinged to the angle member and secured to the back plate member in a position spaced from the front plate member, and a catch construction along opposite edges of the front and back plate members, the catch construction comprising a support member secured to the front plate and an angular catch member hinged to the said support member in a position to engage with the back plate member to hold it in position and means forming a light trap provided along the edges of the cassette on the inside thereof, said flat plate front member comprising a focusing grid, and a U-shaped channel member secured to the said grid as a reinforcing member, the light trap including a female member configurated to fit into the channel member.

15. A cassette construction comprising a flat plate front member, a flat plate back member, a hinge construction at one side of said members, the hinge construction having hinge leaves having attachment to the front plate back plate, one of said leaves forming a side wall for the cassette, and a catch construction at opposite edges of the front and back plates, the catch construction having hinge means having attachment to one of said plates and forming another opposite side wall of the cassette, the plate members, hinge construction, and catch construction being free from portions forming additional cassette side or end walls.

16. A construction as in claim 15, including rigid reinforcing means extending along edge parts of the plate members adjacent to the hinge construction and catch construction.

17. A construction as in claim 16, including rigid reinforcing means extending along ends of the said members.

* * * * *